United States Patent [19]

Morin

[11] 3,820,825

[45] June 28, 1974

[54] FLEXIBLE HOSE COUPLING AND SWIVEL NUT CONNECTOR ASSEMBLY

[75] Inventor: Louis F. Morin, Springfield, Mass.

[73] Assignee: Everflex Products, Inc., Ludlow, Mass.

[22] Filed: Apr. 12, 1973

[21] Appl. No.: 350,057

[52] U.S. Cl............... 285/39, 285/149, 285/247, 285/382
[51] Int. Cl............................................ F16l 35/00
[58] Field of Search ............ 285/39, 149, 256, 382, 285/174, 247, 248, 249

[56] References Cited
UNITED STATES PATENTS

| | | | |
|---|---|---|---|
| 2,525,616 | 10/1950 | Peeps................................. | 285/247 |
| 2,853,319 | 9/1958 | Press................................... | 285/39 |
| 3,112,937 | 12/1963 | Williams........................ | 285/149 X |
| 3,140,106 | 7/1964 | Thomas et al..................... | 285/248 X |
| 3,245,700 | 4/1966 | Appleton............................ | 285/149 |
| 3,675,951 | 7/1972 | Morin................................... | 285/39 |

Primary Examiner—Alfred R. Guest
Attorney, Agent, or Firm—Chapin, Neal and Dempsey

[57] ABSTRACT

A flexible hose coupling having a two part nipple body and swivel connector nut assembly. The body includes, first, a tubular nipple stem formed with a flanged head at its outer end, an adjacent cylindrical neck portion, a reduced central portion extending therefrom which includes a shallow annular recess at the inner end of said portion, and a stepped hose insert portion. The inwardly flanged collar of a swivel nut is rotatably carried on the stem neck portion. The second part of the body is in the form of an outer tubular shell surrounding the central stem portion and anchored in abutting relation to the neck thus mounting the swivel nut between the head and shell. At the fore end of the shell is a flanged tool engaging surface, a hose socket-engaging threaded surface extending therefrom, and an inner shell end in the form of a thin cylindrical skirt deformed and locked into said annular recess to form a unitary body.

4 Claims, 2 Drawing Figures

PATENTED JUN 28 1974　　　　　　　　　　　　　3,820,825

FLEXIBLE HOSE COUPLING AND SWIVEL NUT CONNECTOR ASSEMBLY

BACKGROUND

This invention relates to connector couplings especially for reinforced flexible hose assemblies and the like and particularly to a novel body construction for a re-usable coupling carrying a swivel connector nut at the forward end thereof.

Heretofore in the art couplings with swivel connectors have been joined together in one of several conventional ways. A common method is to provide a flanged head at the fore end of a coupling body over which the inner end of a tubular swivel nut pre-form is slipped and then the inner end is turned downwardly, as by crimping, swaging or otherwise, to form a flanged collar for rotatable turning action. An alternative method is to leave the outer tubular wall of the body member cylindrical at its fore end, slip an inwardly flanged collar of a swivel nut over the fore-end and then spread and expand said end by an internal mandrel expanding tool. Still another standard practice is to provide in the end of a tubular body member an annular groove which cooperates with a groove in the swivel nut to receive a locking wire driven through a hole in the nut, all as is well known.

These standard constructions, while satisfactory in general and widely employed for many years have certain specific drawbacks from the standpoint of reliably efficient operation and of low cost procedures. Where a nut collar or tubular fore end is deformed to assemble the swivel nut on the body, the fit of the inwardly flanged nut collar surface against the flanged or flared coupling end is not always such as to insure the application of evenly distributed annular pressures to connect the end of the tubular coupling passage so as to secure an accurate fluid tight and precision fit at a connection. The degree of accuracy in attaching swivel connectors on to coupling bodies has accordingly not been easily controlled, and superior performance characteristics are not assured without the use of relatively expensive precision tooling operations. This is especially so in the case of re-usable couplings where repeated use involves metal to metal sealing contacts under varying conditions, a factor which can adversely affect efficiency particularly in high pressure industrial fluid systems. As will also be seen standard assembly operations as above outlined fail to take advantage of using an inexpensive type of nut.

It is an object of the present invention to provide a high pressure hose coupling body structure capable of using an inexpensive type of mass produced swivel nut connector and thereby gain significant cost advantages while preserving a high degree of efficiency over an extended useful life of the fitting.

As a specific example of a re-usable coupling structure for flexible hose assemblies and to which the present invention has particular applicability, reference is made to the coupling disclosed in my prior U.S. Pat. No. 3,675,951 issued July 11, 1972. As there shown the body of the coupling is a single piece member having its connector end formed with exterior threading for attachment. The present invention is designed to provide a swivel nut connector in this coupling form without adding significantly to the cost of the same as would normally be the case under present standard procedures, and at the same time to provide a construction which will assure a high degree of performance in repeatedly obtaining a reliable sealing action.

As herein disclosed the coupling body is a two-part structure in which a nipple stem member and an outer shell member are fitted together with a metal to metal fluid-tight sealing and locking connection in order to assemble the swivel nut on the body.

A composite stem and outer shell formation is, broadly speaking, old as disclosed in the nearest known prior art, U.S. Pat. No. 2,525,616 of Oct. 10, 1950. This patent discloses the parts fastened together by staking to provide the body of a hose connection for spray gun use. The present invention contemplates a close sleeve-like fit and embracing relation between the parts from the fore end to the inner end of the shell and provision for a metal sealing and locking relationship at the inner end of the shell.

SUMMARY OF THE INVENTION

This invention contemplates an inner tubular stem member having a plurality of stepped cylindrical outer surfaces defining from the fore end: a flanged head portion, a neck portion, a reduced central shell-receiving portion with a shallow annular recess at its inner end, and a terminal hose insert portion preferably formed to include an annularly ribbed section and still further reduced tip section. The reduced collar of a swivel nut is mounted on the neck of the stem between the head and forward face of a shell member which closely embraces the central stem portion and abuts said neck at its fore end. At its inner end the shell is provided with a thin annular skirt substantially coextensive with the shallow recess and into which the skirt is compressed and deformed in a sealed and locking relationship therewith. The outside surface of the shell provides a tool engaging fore end and extending therefrom a threaded portion for receiving a hose clamping socket.

DRAWINGS

FIG. 1 is a longitudinal section of the coupling body members in assembled relation with a swivel nut and prior to fastening the members together; and FIG. 2 is a similar view showing the coupling body members in locked relation and the coupling assembled on the end of a reinforced flexible hose.

DESCRIPTION OF PREFERRED EMBODIMENT

Figure 1:
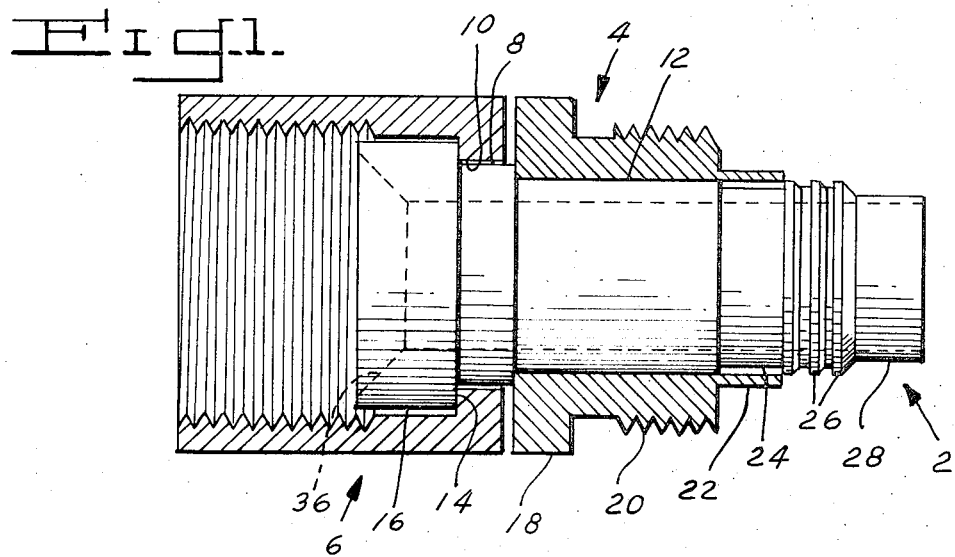

In FIG. 1 the two-part coupling body, comprising an inner nipple stem member 2 and an outside sleeve or shell member 4, is shown in position for assembly into unitary form to permanently carry a swivel nut connector 6 at the fore end. As will be apparent the parts have been assembled by first slipping the nut forwardly (as to the left in FIG. 1) over the reduced end of stem 2 and then encircling the neck portion at 8 with the inner reduced collar 10 of the nut. The shell 4 is in similar manner then slipped over the stem until the forward face thereof abuts the stepped shoulder defining the end of neck portion 8. A central stem portion 12 receives the bore of the shell in a closely fitted relation.

The collar 10 is thus positioned between the preformed rear annular face 14 of a flanged head 16 at the front end of the tubular stem and the front wall of a flanged head portion 18 of shell 4. Rearwardly of the shell head 18, which is formed with tool engaging surfaces as the hex flats shown by FIG. 2, the shell is provided with exterior threading at 20 on which a hose engaging socket clamp 34 may be turned as will also be seen in FIG. 2.

The inner end of the shell is in the form of a thin walled cylindrical skirt 22 the length of which coincides substantially with the length of an annular recess 24 defining the end of the central shell bearing portion 12 of the stem. The inner bore of the shell as in FIG. 1 is uniform in diameter from end to end and with a close sliding fit embraces the major part of portion 12, the skirt 22 overlying the shouldered recess 24 as shown.

Figure 2:
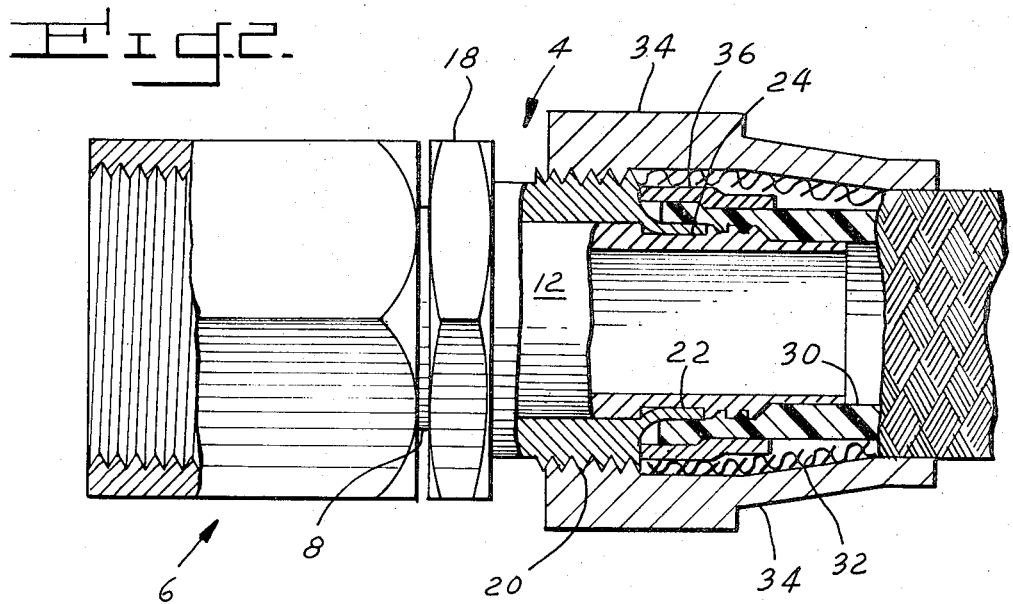

The stem and shell are locked together as a unitary coupling body by deforming and compressing skirt 22 as by a suitable swaging process and forcing the skirt into recess 24 substantially as seen in FIG. 2. It will be noted that in doing so the outside diameter of the skirt is substantially the same as that defined by the flat tops of the annular ribs on the stem at 26 inwardly of recess 24. Beyond the ribs a further reduced terminal portion 28 of the stem forms the end of the nipple insert section. By compressing and deforming the skirt into the shouldered recess the intimate metal to metal contact formed by standard swaging methods not only forms a substantially leak-proof joint but also binds the two parts together against relative rotation to be encountered by any normal handling conditions. Where added leak-proof sealing qualities are desired, an interference fit may be provided between stem 2 and sleeve 4. Sleeve 4 is then assembled on portion 12 by suitable press-fitting operations and thus more securely prevents the development of any leakage path in this area.

With further reference to FIG. 2 the flexible hose there shown comprises an inner liner 30 of plastic composition such as extruded polytetrafluorethylene and an encasing sheath or armoring 32 of conventional wire braiding. The coupling is joined to the end thereof by first slipping a clamping socket 34 over the end of the wire braiding, inserting a so-called "friction compression" ring 36 between the braid and liner and the inner nipple end of the coupling into the bore of the liner. Then by advancing the socket sleeve 34 forwardly to engage and turn on the threads 20 of the shell into the position shown, the liner is progressively clamped and compressed on to the nipple in sealing relation therewith and the wire braid anchored in the assembly as indicated, all as more particularly detailed in my aforementioned U.S. Pat. No. 3,675,951. The only refinement of the patented assembly as herein shown lies in that section of the nipple stem portion comprising the addition of the ribs at 26 which provide further gripping means forwardly of the conical shoulder at the juncture with the reduced tip section 28. Otherwise the parts function in a manner corresponding to said patent disclosure in "frictionally compressing" the liner wall for a secure sealing action.

In thus forming the body from a two part assembly the annular face of the swivel nut collar 10 and the opposed surface 14 of the stem head can easily be formed with sufficient precision so that an even distribution of pressures can be assured in drawing a mating tubular connection into accurate sealing contact against the conical seat 36 (FIG. 1) of the stem passage. The accurate mating of the collared surfaces between nut and head is otherwise uncertain where either is produced by "in place" forming operations. The present method also permits cost savings by making practical for accurate use in such coupling assemblies standard tube fitting nuts as commonly supplied for the plumbing industry according to various SAE and other standard specifications. Such conventional items are inexpensive because of extremely high volume production for ordinary plumbing usage but have not heretofore been considered feasible for application in high pressure reusable hose coupling structures.

What is claimed is:

1. In a re-usable coupling for flexible hose assemblies in which a swivel nut is rotatably mounted on the connector end between a flanged head and a shouldered enlargement of the coupling body, the body also having inwardly thereof means for attaching a socket sleeve hose clamping means, and a reduced nipple end section insertable in the end of a hose and provided with surfaces for cooperating with said hose clamping means so as to provide a fluid tight mounting on said hose, the improvement which comprises a two piece nipple body structure having an elongated tubular nipple stem section provided with a flanged head at its fore end and extending inwardly thereof in sequence; a neck portion, a reduced central shell support portion terminating in a shallow shouldered recess, and a nipple insert portion; and a shell body section having a bore engaging said central support portion of the stem and in abutting relationship against the inner end of said neck, the shell having at its fore end a shouldered torque applying tool surface and inwardly thereof an intermediate portion provided with clamping sleeve attachment means and a shouldered inner end in the form of a thin tubular skirt extension of said shell bore, the wall of said skirt extension being compressed and annularly deformed into sealed locking engagement in said shallow recess of the stem section, whereby an internally collared swivel connector may be assembled on said neck portion prior to sealing said body sections together.

2. The structure of claim 1, in which, the depth of said stem recess and wall thickness of said skirt extension of the shell are substantially equal in dimension and in said sealed locking condition thereof the surface of said skirt merges into an outer wall uniform with said shell supporting stem portion.

3. The structure of claim 2, in which, the nipple insert portion of said stem is provided with an annularly ribbed surface adjacent said shouldered recess and an inwardly tapered shoulder on the stem merges with a further reduced cylindrical terminal tip end portion of said stem.

4. The structure of claim 3 in which the bore of said shell body section engages said central support portion of the stem with an interference fit.

* * * * *